Nov. 11, 1924.
R. C. MITCHELL
MOUNTING FOR SHAFT BEARINGS
Filed April 17, 1922
1,515,266
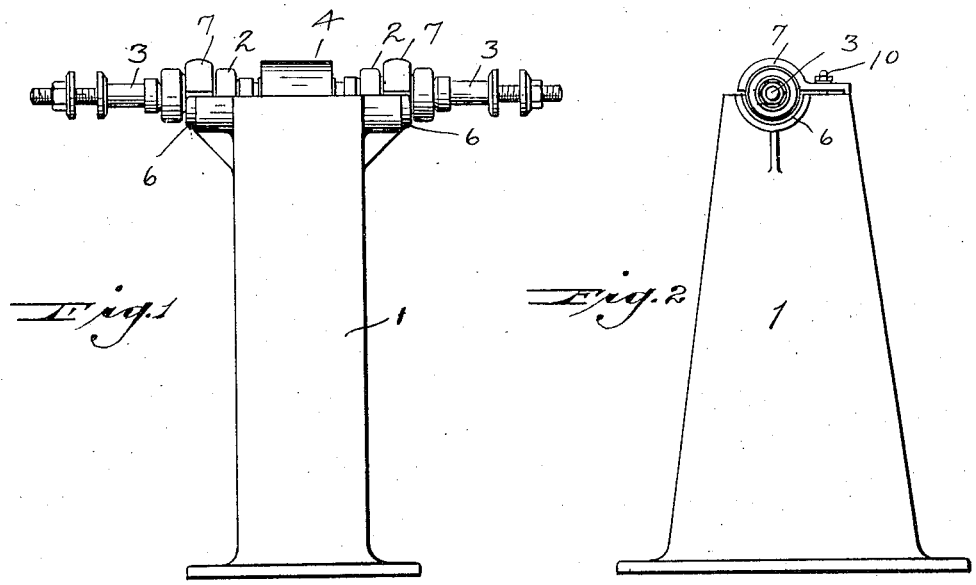
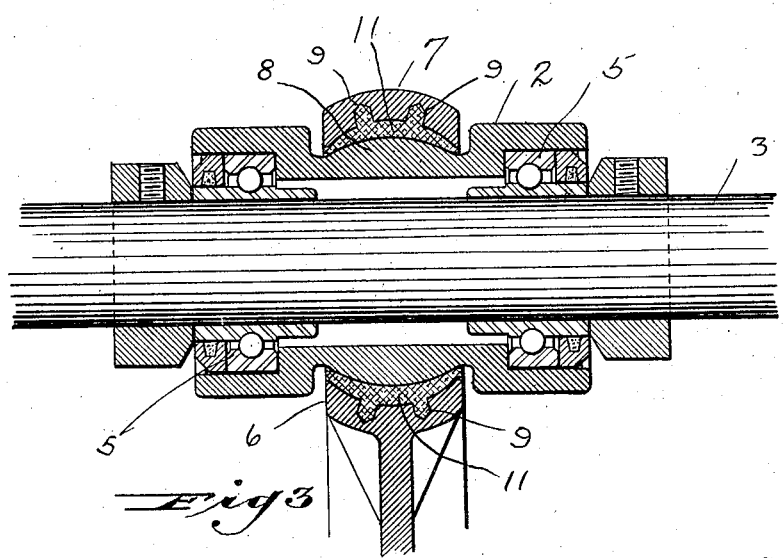
Inventor
Raymond C. Mitchell
By F. L. Walker
Attorney Patented Nov. 11, 1924.

1,515,266

UNITED STATES PATENT OFFICE.

RAYMOND C. MITCHELL, OF SPRINGFIELD, OHIO, ASSIGNOR TO THE MITCHELL ENGINEERING COMPANY, OF SPRINGFIELD, OHIO, A CORPORATION OF OHIO.

MOUNTING FOR SHAFT BEARINGS.

Application filed April 17, 1922. Serial No. 554,119.

*To all whom it may concern:*

Be it known that I, RAYMOND C. MITCHELL, of Springfield, county of Clark, State of Ohio, a citizen of the United States, have invented certain new and useful Improvements in Mountings for Shaft Bearings, of which the following is a specification.

My invention relates to grinders and polishing lathes and more particularly to a mounting for self alining shaft bearings for such structures.

It is quite the common practice to provide shaft bearing sleeves, having a limited universal adjustment in relation with the supporting stand or pedestal, in order that the bearings may be accurately alined during assembly of the structure, after which the adjusted bearings are fixedly secured in their adjusted relation. To this end such bearing sleeves are ordinarily provided with substantially spherical or convex peripheral bands or zones to be seated in correspondingly concave sockets or collars upon the stand or pedestal. The production of such mountings is quite expensive, and difficult particularly the accurate boring of the sockets or concaved collar to receive the bearing sleeve.

The purpose of the present invention is to economize labor and expense by eliminating the necessity for boring or machining the interior of such concave socket or collar to receive the bearing sleeve, and provide an accurately fitting socket or mounting by casting within the bearing sleeve receiving recesses of the supporting structure, accurately contoured faces, which will not require machining or finishing operations.

The object of the invention is to simplify the structure as well as the means and mode of production, of such mountings for self alining bearing sleeves, whereby such mountings will not only be cheapened in construction, but will be more accurate, capable of being quickly made, and unlikely to get out of repair.

A further object of the invention is to provide a mounting which may be produced by unskilled mechanics without the necessity of expensive machinery, such as a large boring mill, and without the necessity of handling the heavy stand or pedestal as is necessary when such sockets are produced by machine operation.

With the above primary and other incidental objects in view as will more fully appear in the specification, the invention consists of the features of construction, the parts and combinations thereof, and the mode of operation or their equivalents as hereinafter described and set forth in the claims.

In the accompanying drawing, wherein is shown the preferred, but obviously not necessarily the only form of embodiment of the invention, Fig. 1 is a front elevation of a polishing lathe, or grinder stand, in which the mounting forming the subject matter hereof is usually embodied. Fig. 2 is a side elevation thereof. Fig. 3 is a detail sectional view illustrating the mounting hereafter described and claimed.

Like parts are indicated by similar characters of reference throughout the several views.

While the improved mounting for self alining shaft bearings hereinafter described, is shown in the drawings and referred to as embodied in grinding wheel stands and polishing lathes, it is to be understood that it is not limited to such use, but may be applied to other constructions, wherein such initial universal adjustment of the bearing sleeve is desirable, as in line shaft hangers and various mechanical structures, other than grinders and polishing lathes.

In the accompanying drawings, 1 is the pedestal or stand, of a grinder or polishing lathe, upon which is supported in bearing sleeves 2, the shaft 3 rotated by the centrally disposed driving pulley 4. The bearing sleeve 2 incloses standard ball bearings 5, which, however, form no part of the present invention. The bearing sleeves 2 are located in supporting collars or sockets 6, the lower halves of which are formed directly in the pedestal or stand mounting 1, while the upper halves are in detachable caps 7, adjustably mounted upon the stand 1, for clamping action.

In order to afford a limited universal adjustment of the bearing sleeve 2, when initially assemblying the structure in order that the bearing sleeves may be alined one with the other, and be made to conform to the alignment of the shaft, such sleeves are provided medially with a convex or spherical zone or peripheral band 8. This peripheral zone or band 8 may be economically and accurately produced by a turning operation, However, the production of a corresponding concave socket or receiving recess within the pedestal 1 and cap 7, as now produced, necessitates the machining or boring of the interior surface, of the bearing 6. The pedestals or stands 1 being quite heavy and of comparatively large size, renders the boring or machining operation quite inconvenient and expensive. Moreover, such machining operation requires elaborate preparation and the use of expensive machine tools, all of which is obviated by the use of the present invention.

To overcome the present difficulty, the pedestal bearing 6 and collar 7 are cored out in the foundry casting of the pedestal to a size somewhat greater in diameter than that of the convex zone 8 of the bearing sleeve. The interior of such cored out recess is preferably though not necessarily of different transverse arcuate contour, as shown in Fig. 3. That is to say, the contour of such annular mounting in an axial direction is upon a radius somewhat shorter than the corresponding radius of the zone 8 of the bearing sleeve. This difference of arcuate contour, however, is not essential. The interior of such cored recess is provided with a number of radially disposed holes or depressions as at 9, which afford anchorage for the cast in face of the mounting.

Within the mounting thus prepared as it comes from the foundry and without preliminary machining or boring operation, there is introduced an arbor or mandrel having thereon a peripheral band or zone of spherical or convex form, corresponding in dimension to the zone or peripheral band 8 of the bearing sleeve 2. This arbor or mandrel is concentrically positioned within the mounting, it being understood that the detachable cap portion 7 is at such time firmly secured to the pedestal or stand 1, in the relation which it is to occupy in the final structure. The intermediate space between such concentrically positioned orifice or mandrel and the bearing 6, within the pedestal and the cap 7, is then filled with metal, such as Babbitt metal, stereotype metal or other suitable material having a comparatively low fusing point. This metal when cooled forms a concave face or interior lining 11 within the socket or mounting, which conforms accurately and closely to the inserted mandrel or arbor. The arbor or mandrel being shaped to substantially the identical proportion of the bearing sleeve, such shaft lining or facing within the socket or mounting will subsequently conform accurately to the sleeve. Before pouring the metal to form the lining or casing within the mounting, a parting sheet or strip is preferably inserted between the cap 7 and the pedestal in order that the lining or facing may be formed in two separable sections one of which is anchored by the holes 9 within the pedestal portion 6, while the other section is likewise anchored within the cap 7. This parting sheet or strip may have an orifice therein to form an intercommunicating passage between the upper and lower portions of the mounting, so that the molten metal will readily pass from one portion to the other. Such hole will produce an interconnecting sprue which is easily severed or broken, upon removing the cap after casting the face or lining within the mounting, and removing the mandrel or arbor, such incast facing or lining will be found to have a uniformly smooth surface accurately contoured to receive the bearing sleeve 2 without the necessity of machine operation.

The bearing sleeve 2 is located within such interlined mounting with the cap 7 loosely adjusted until the shaft 3 is inserted within the bearing sleeve, and the bearing sleeve brought to proper alined relation, whereupon the cap 7 is tightly adjusted upon such bearing sleeve, by means of the adjusting screw or bolt 10. The bearing sleeve is thus fixedly clamped in relation with the pedestal by the cap 7.

While it has been quite common to provide Babbitt bearings for a shaft by casting a bearing lining within a shaft housing, the present construction is in no sense a bearing structure as the sleeve 2 is to be stationarily held within the mounting after being brought into proper alinement. The only relative movement of the sleeve within the mounting is during the initial assembly, during which the sleeve may be twisted or turned in various directions within a limited range, in order to bring two or more such bearings into proper alinement, or parallelism one with the other. This having been done the mounting or socket is tightly clamped upon the sleeve to hold the sleeve in such adjusted relation. The structure is thus in effect an annular split collar, having a die cast internal lining or facing for positive clamping engagement with the convex or spherical zone of the inserted stationary bearing sleeve.

The method described affords a cheap, economical and rapidly made mounting, which obviates entirely the labor and expense of accurately machining such interior concave annular surface.

From the above description it will be apparent that there is thus provided a device of the character described, possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprises the preferred form of several modes of putting the invention into effect and the invention is therefore claimed in any of its forms or modifications within the legitimate and valid scope of the appended claims.

Having thus described my invention, I claim:

1. A shaft bearing wherein a bearing sleeve is mounted for limited universal adjustment within a socket member, characterized by an interlining of comparatively soft material cast in situ within the socket member, substantially as and for the purpose specified.

2. A shaft bearing wherein a bearing sleeve is mounted for limited universal adjustment within a socket member, characterized by an interlining within the socket member, conformable to the exterior face of the bearing sleeve without the necessity of machining.

3. A shaft bearing wherein a bearing sleeve having a convex peripheral band is mounted for limited universal adjustment within an encircling collar, characterized by a concave interlining cast in situ within the encircling collar and conforming to the convex peripheral band of the sleeve without preliminary machining.

4. The herein described method of providing a universal mounting for bearing sleeves and the like, consisting in providing a socket collar of greater internal diameter than the diameter of the sleeve, inserting within the enlarged socket collar a body having a convex peripheral configuration agreeing with a like exterior shape of the bearing sleeve, and pouring within the intervening space molten metal to form an interliner for the socket collar having a concave internal face conforming to the exterior shape of the bearing sleeve without preliminary machining.

5. The herein described method of providing a universal mounting for bearing sleeves and the like, consisting in providing a socket collar of greater internal diameter than the diameter of the sleeve, providing within the enlarged socket collar spaced anchorage recesses, locating within the socket member a body having exterior shape corresponding with that of the bearing sleeve, and casting in situ about said body and within the collar, an interlining which will conform to the contour of the bearing sleeve without further shaping.

6. In a construction of the character described, wherein two members are capable of a limited degree of universal adjustment, comprising a collar member, a sleeve extending through the collar for relative wobble movement in relation one to the other, a convex exterior face upon the sleeve, said convex exterior face being of less diameter than the interior diameter of the collar and an interposed bushing of fusible metal fixed in relation with said collar and forming a socket bearing for the convex surface of the sleeve upon which the sleeve and collar are capable of relative oscillatory movement to different degrees of axial inclination.

7. In a construction of the character described, wherein two members are mounted for limited wobble movement to varying degrees of axial inclination, one member having an opening therein, a second member having a spherical zone of less diameter than the dimensions of the opening in the first member, inserted within said opening and a body of fusible metal cast in situ within the opening of the first member and around the spherical zone of the second member to form a bearing upon which said members are capable of relative adjustment to varying degrees of inclination one to the other.

8. In a construction of the character described, wherein one member is mounted within another member for limited wobble movement to varying degrees of relative inclination, one of the members having an opening therein, within which the other member is projected, the contiguous faces of said members within the opening being of non-conformity, and spaced one from the other, one of said contiguous faces being of substantially spherical form, and a body of fusible metal cast in situ between the contiguous non-conforming faces of the respective members and forming a bearing surface conforming to and engaging the said spherical face to accommodate the relative angular adjustment of the members.

9. In a construction of the character described, wherein two members are interconnected for relative wobble movement to varying degrees of axial inclination, one of the members having an opening therein into which the other member is projected in spaced relation with the sides of the opening, the contiguous faces of the members within the opening being separated one from the other, such face of one member being spherical to the center of relative oscillation of said members, the face of the other member being adapted to receive and hold a stratum of bearing material and a stratum of bearing material formed in situ intermediate said contiguous faces, said stratum of bearing material being anchored to one of said members and having sliding engagement on said spherical face.

10. In a spindle mounting of the character described, a revoluble shaft, ball bearings in which said shaft is revolubly mounted, and a universally adjustable sleeve in which the ball bearings are carried substantially as specified.

11. In a spindle mounting of the character described, a revoluble shaft, spaced mountings for said shaft in which the shaft is revolubly mounted, said mountings including a plurality of sleeves each having an external spherical surface, and enclosing collars having corresponding interior bearing surfaces upon which the sleeves are capable of limited universal wobble adjustment whereby the sleeves are rendered self aligning into axial parallelism with each other and with the shaft mounted therein.

12. In a grinding and polishing lathe and the like, a supporting frame, a revoluble spindle and self aligning bearings for said spindle comprising sleeves having spherical external zones, ball bearing collars seated in said sleeves, in which the spindle is mounted, said frame having therein concave seats for the external spherical zones of said sleeves in which the sleeves are capable of limited wobble movement into axial alignment with each other.

In testimony whereof, I have hereunto set my hand this 10th day of April, 1922.

RAYMOND C. MITCHELL.

Witnesses:
W. W. WITMEYER,
IRENE M. MAHER.